Nov. 21, 1933.  E. C. WINKLER ET AL  1,936,281
PROCESS FOR DISEMBITTERING AND IMPROVING SOYA BEANS OR LIKE LEGUMINES
Filed July 22, 1931
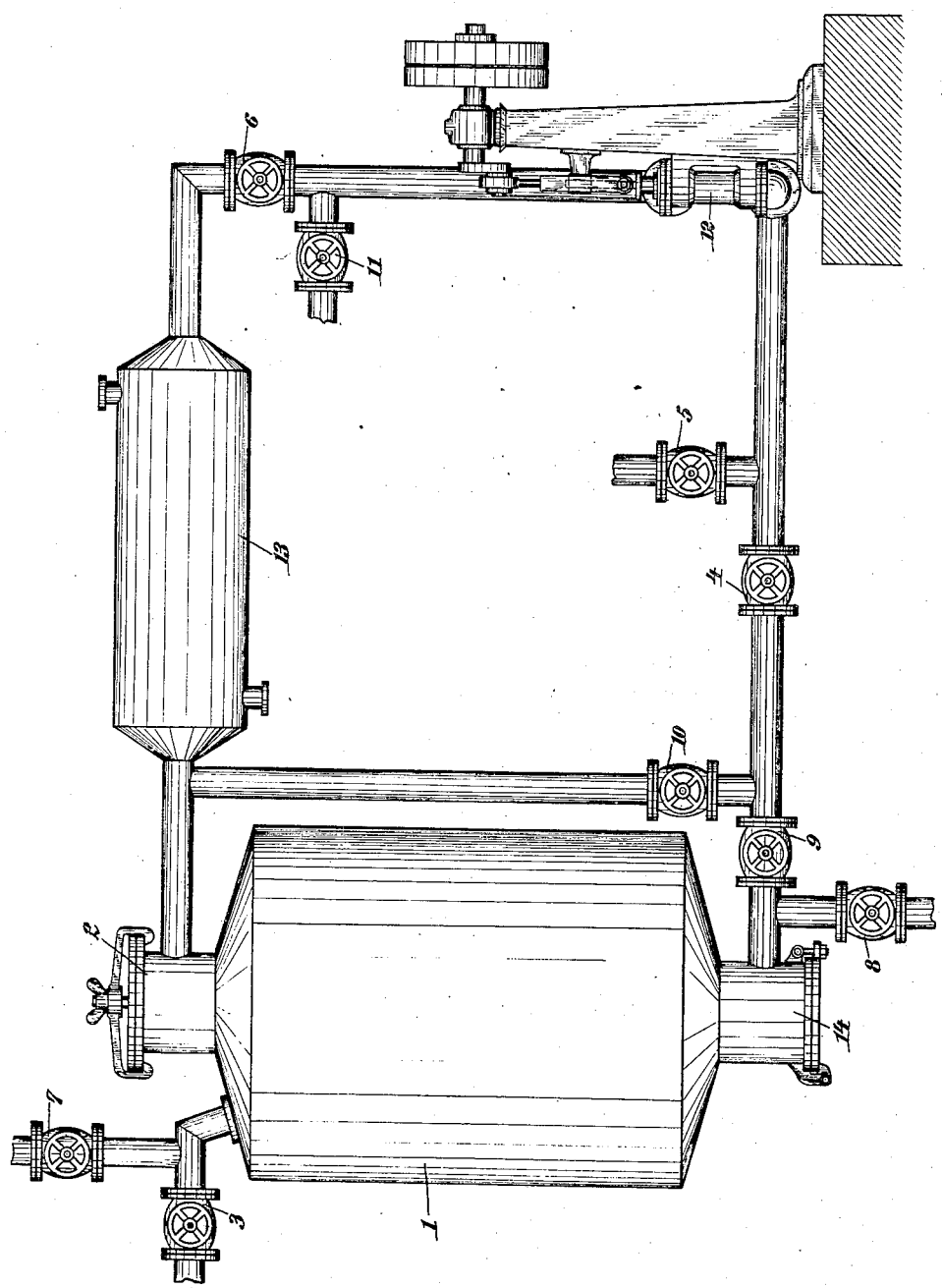

Patented Nov. 21, 1933

1,936,281

UNITED STATES PATENT OFFICE 1,936,281

PROCESS FOR DISEMBITTERING AND IMPROVING SOYA BEANS OR LIKE LEGUMINES

Egon Carl Winkler and Hubert Goller, Vienna, Austria

Application July 22, 1931, Serial No. 552,526, and in Austria August 12, 1930

4 Claims. (Cl. 99—11)

This invention has for its object to increase the albuminous and fat contents of the soya bean and further to improve the badly tasting and unwholesome raw fruit with the result of producing a biologic immaculate and easily digestible choice fruit of a relish like almonds. The present process is, of course, also applicable for the improvement of raw fruits of other legumes.

Quite a number of processes are known for the treatment of soya beans in order to improve the relish of the different produces made from soya beans such as milk, sauces, albumen and so forth. The processes destroy the seed-case, reduce the seed, hereafter extract from the same either the desired or undesired substances and utilize according to requirement either the extract or the part which remained behind. Also dissolved substances are removed from the extract by precipitation. In many cases a number of extractions are successively carried out at different temperatures.

A process is also known which consists in lixiviating the soya beams at atmospheric pressure by means of water at a temperature of approximately 90 degrees centigrade, the lixiviation being promoted by the addition of alkaline salts and the simultaneous or alternate application of electric current.

It is also known to improve the relish of soya beans by subjecting the same to a temperature of 100 degrees centigrade and subsequently blowing steam through the beans for a short space of time, whereby the poisonous and bitter ingredients are extracted from the beans.

It has been found that the use of far lower temperatures than above mentioned are possible, if an overpressure or a vacuum is resorted to, this being of great advantage because the biologic structure of the albumens is not damaged.

Experiments have shown, that the seed-case of the soya bean (palisade-cell with the four layers of the scale) acts like a semi-permeable diaphragm if a suitable diffusion agent is employed and corresponding conditions of temperature and pressure (overpressure or vacuum) are prevailing.

The application of overpressure possesses the advantage, that the seed-case of the soya bean is rendered permeable far quicker by the breaking or disintegration of the cells and at lower temperatures than it is the case at atmospheric pressure.

The treatment under vacuum promotes the osmotic discharge of the small-molecular particles (carbohydrates and so forth) of the seed of the soya bean at a lower temperature than it is possible at atmospheric pressure. The original form of the albuminous molecules is not endangered by the application of lower temperatures and thus the albumin does not diffuse outward through the seed-case.

However the diffusion of small molecular substances, such as carbohydrates and so forth, can be effected without difficulty.

This knowledge is utilized by the present process which is based on the different speed of diffusion of the albumin and fat and of the carbohydrates and so forth.

In this way the valuable albumin and oil constituents of the fruit are quickly and easily enriched practically without loss, because practically only traces of the large colloid constituents of the highly molecular albumin are diffused, while the readily soluble carbohydrates and so forth are diffused without difficulty and the fat particles are retained in the seed.

A considerable advantage of the present process consists in that the lowest temperature possible can be resorted to in order to obtain a lasting improvement of the relish. In view thereof the quality of the albumin is not changed biologically, which has been proven by suitable tests of emulsification.

The choice produces thus obtained which are rich in vitamines are eatable without exception as numerous experiments (also with animals) have clearly shown.

The process is carried out by means of warm water as diffusion agent and it is of advantage to work at a temperature of 65 to 70 degrees centigrade at an overpressure of 1 to 2 atmospheres.

A vacuum of approximately one atmosphere at practically the same temperature is used if it is desired to treat the material with particular care.

Atmospheric pressure calls for a working temperature of more than 80 degrees centigrade, and this temperature may already impede the advantageous utilization of the process.

It is of the greatest importance to keep to the temperatures suited to the pressures because, already in case of a comparatively slight variation of the corresponding temperature, the quality is reduced biologically and the intended improvement of the relish does not take place.

Liberated fatty acids which may be the cause of the soya beans growing rancid, may remain in the improved soya beans or in other legumines improved by the present process.

It has been found, that the detrimental traces of fatty acids can be readily removed in that the improved legumines are placed into an alkaline bath before removing the husk. Preferably clear lime water is used for this purpose. Thereby are produced water-insoluble calcium salts of the fatty acids which are quite flavourless. These calcium salts remain in the fruit thus treated, and no drawback arises therefrom, because the same are not harmful to the organic body and further the quantity is so small that their presence is of no consequence.

*Example*

The desired quantity of washed and unhusked soya beans is placed into a suitably perforated receptacle, which is inserted in a closed tank, which may be heated and is fitted with means for varying the pressure and further is provided with an agitating mechanism or the like. The quantity of water to be added depends on the kind of the desired final product.

The required quantity of water having a temperature of approximately 68 degrees centigrade is supplied and the necessary pressure is produced by forcing-in air, if it is desired to work with over-pressure.

The optimum pressure is two atmospheres.

If it is desired to work at a vacuum, the tank charged with the beans is subjected to a vacuum (approximately one third of an atmosphere) and subsequently water of a temperature of approximately 65 degrees centigrade is admitted whereby the vacuum is maintained. After the elapse of about two hours, the extract of diffusion is removed and subjected to further treatment. According to the material used, a diffusion extending over 20 to 30 minutes will be quite sufficient if it is desired to generally improve the relish. Also the known diffusion plants of the sugar refineries are very well suited in case of a treatment on a very large scale.

In order to prevent any rancidity owing to the presence of liberated fatty acids, the diffusion liquid is removed from the diffusion vessels in which the disembittering has taken place or a separate diffusion-vessel is charged with a clear lime water heated to 60 to 70 degrees centigrade or with another alkaline solution of the same strength and the beans are subjected for about 10 minutes to the action of the same either at atmospheric pressure, vacuum or overpressure and under the same conditions as those which prevailed during the disembittering. Hereafter the alkaline liquid is removed, the beans are thoroughly washed and further treated.

In all these processes it is a condition that the cleaned legumines are treated in the unchanged state, e. g. unhusked and not broken up.

If it is desired to dry the improved beans and preferably after the adhering water has been removed (for instance by treatment in a centrifugal separator), the still unhusked or the already husked beans and so forth are placed onto large areas (hurdles) and dried by airing (preferably suction). The fruits are quickly dried in this way and may be husked in suitable machines if this has not been carried out before the drying operation, and now they are ready for grinding and further utilization.

The examination of the soya beans before and after the treatment set forth in the above example yielded the following result:—

|  | Raw bean | Final product |
|---|---|---|
|  | Expressed in percent on dry substance | |
| Raw protein | 44.72 | 51.55 |
| Carbohydrates | 28.07 | 18.92 |
| Fat | 22.39 | 26.13 |
| Mineral substances | 3.82 | 3.40 |

The bitter principals were completely extracted, and the extract contained only 0.26% albumin.

A diagrammatic view of the plant for carrying out the process according to the present invention is illustrated by way of example in the accompanying drawing.

The plant operates in the following manner if the process is carried out at an overpressure.

The beans to be disembittered are charged by way of the inlet 2 into the diffuser 1 until approximately one-fifth of the volume of the latter is filled with beans, and the diffuser 1 is filled with warm water by way of the cock 3. Hereafter the inlet 2 and the cocks 7, 8, 9, 10, 11 are shut, while the cocks 3, 4, 5, 6 remain open. Now the plant is subjected to pressure and for this purpose the cocks 3, 7, 8, 9, 10, 11 are shut, while the cocks 4, 5, 6 remain open. The pump 12 is now operated and draws-in air by way of the open cock 5 and forces the same through the caloric vessel 13 into the diffuser 1 until the necessary overpressure is produced therein. Hereafter the liquid within the diffuser is circulated by the action of the pump 12 and in order to attain this object it is necessary to shut the cocks 3, 5, 7, 8, 10, 11 and to open the cocks 4, 6, 9, the water of the diffuser being forced through the caloric vessel 13 in order to maintain the temperature at a constant height. The pump 12 is stopped and the cock 8 is opened whenever the beans are disembittered. The liquid of the diffuser is practically completely forced out by the overpressure and the latter disappears. Hereafter the cocks 10 and 11 are opened, so that the liquid, which remained in the pipings, can flow off.

In order to prevent the beans growing rancid, the cocks 3, 8, 9, 10 are shut and the cocks 4, 5, 6, 11 are opened, while the warm preservation liquid is supplied by way of the cock 7. Thereby are open cocks 6 and 11 serve as evacuation openings. If desired the preservation liquid can be placed in circulation. After the process of preservation is concluded, the preservation liquid is discharged by way of the open cocks 6, 8, 11 and hereafter the door 14 at the bottom end of the diffuser 1 is opened and the preserved beans drop out of the diffuser.

If it is desired to operate the plant at a vacuum, the cocks 3, 5, 6, 7, 8, 9 are shut and the cocks 4, 10, 11 are opened, while the diffuser 1 is charged with beans until approximately one-fifth of its volume. Hereafter the inlet 2 is shut and the pump 12 is placed in operation, which sucks air from the diffuser 1 by way of the cocks 4, 11 and forces the same out by way of the cock 11. Whenever the desired vacuum is reached, the cock 3 is opened and warm water is admitted to the diffuser 1 until the same is filled, thereby the pump 12 operates in order to maintain the vacuum. Hereafter the cock 3 is again shut and circulation of the liquid by means of the pump.

If it is desired to discharge the diffusion-solution, the pump 12 is stopped and the cock 11 is slowly opened in order to increase the pressure within the plant to atmospheric pressure. Hereafter the cocks 8 and 10 are opened in order to discharge the contents of the apparatus. The preservation and discharge is carried out in the same way as in the example first mentioned (overpressure).

The plant can be operated at a vacuum also in such a manner, that the diffuser 1 is filled with the beans to be disembittered and the warm water in the same way as it is the case in connection with the operation at an overpressure. In this event the pump 12 is operated while the cocks 3, 5, 6, 7, 8, 9 are shut and the cocks 4, 10, 11 are open. Otherwise the operation is the same as above described.

We claim:—

1. Process for disembittering and improving soya beans or like legumines, consisting in extracting the readily soluble particles by dialysis with water at a pressure other than atmospheric pressure and at a temperature between 65 and 80° C., whereby the seed cases of the beans act like a semi-permeable diaphragm.

2. Process for disembittering and improving soya beans or like legumines, consisting in extracting the readily soluble particles by dialysis with water at an overpressure and at a temperature between 65 and 80° C., whereby the seed cases of the beans act like a semi-permeable diaphragm.

3. Process for disembittering and improving soya beans or like legumines, consisting in extracting the readily soluble particles by dialysis with water at a vacuum and at a temperature between 65 and 80° C., whereby the seed cases of the beans act like a semi-permeable diaphragm.

4. Process for disembittering and improving soya beans or like legumines, consisting in extracting the readily soluble particles by dialysis with water at a pressure other than atmospheric pressure and at a temperature of 65° to 75° C., whereby the seed cases of the beans act like a semi-permeable diaphragm.

EGON CARL WINKLER.
HUBERT GOLLER.